Oct. 12, 1943.     E. W. JOHNSON     2,331,782
SHOCK ABSORBER
Filed March 10, 1942     3 Sheets-Sheet 1

Ernest W. Johnson
By
Watson, Cole, Grindle & Watson
ATTYS.

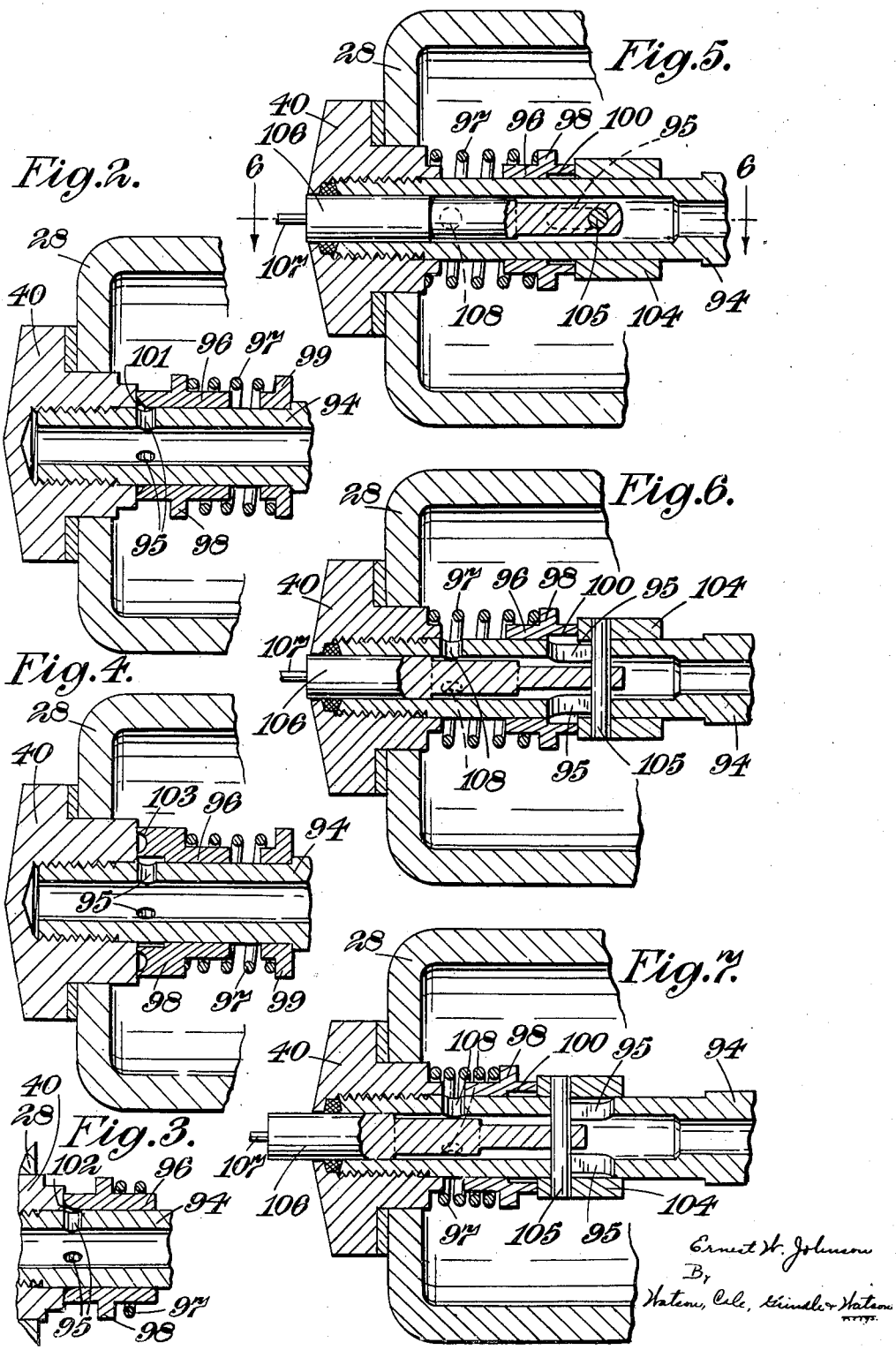

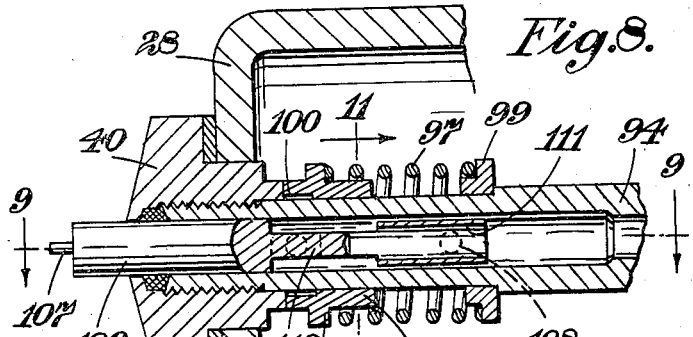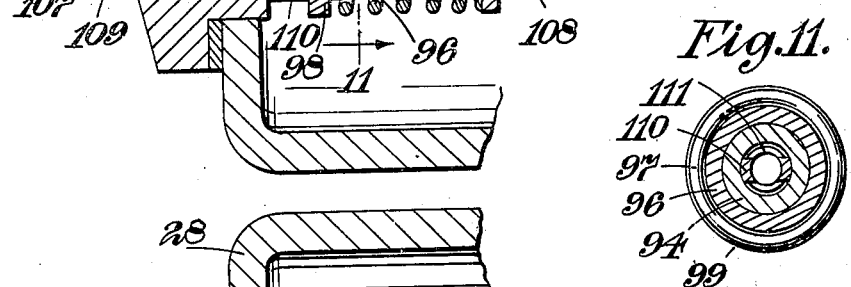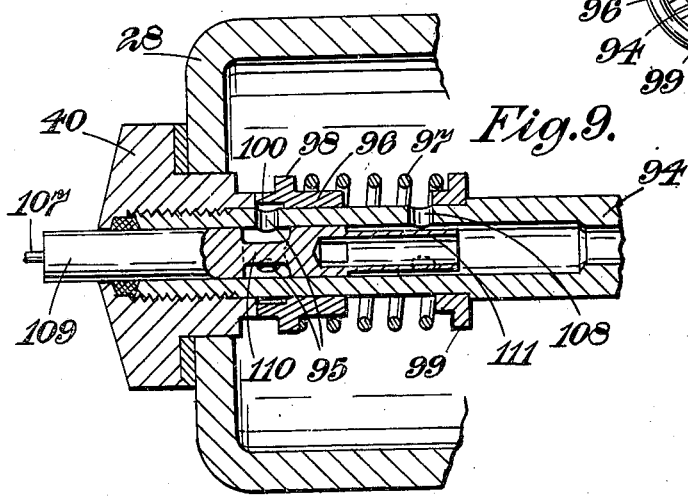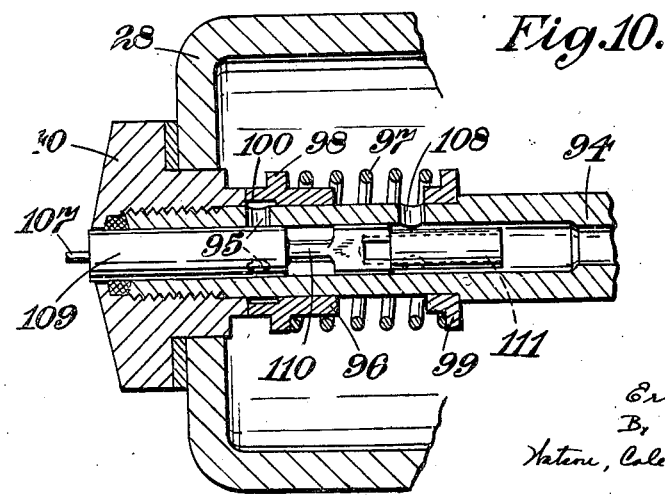

Patented Oct. 12, 1943

2,331,782

UNITED STATES PATENT OFFICE 2,331,782

SHOCK ABSORBER

Ernest William Johnson, Birmingham, Warwickshire, England, assignor of one-half to Vandervell Products Limited, London, England, a British company Application March 10, 1942, Serial No. 434,154
In Great Britain March 13, 1941

16 Claims. (Cl. 188—88)

This invention is for improvements in or relating to shock absorbers and has for one of its objects to enable the character or shock-absorbing value of the shock absorber to be changed according to circumstances.

Stated broadly, the invention is concerned with shock absorbers of the type in which a restricted passage for the flow of the damping fluid is provided between the opposed surfaces of a perforation in a piston and a metering rod which reaches into said perforation in such manner that the piston reciprocates along the metering rod in its cylinder inside the shock absorber casing. If the metering rod is readily detachable, another of different dimensions or construction could be substituted for it in order to change the character or shock-absorbing value of the shock absorber. Thus, for a solid metering rod, a hollow one could be substituted which has through its interior a valve-controlled by-pass for the said restricted passage, and stated more specifically, the invention is concerned with shock absorbers in which the metering rod has such a valve-controlled by-pass.

It is an object of the invention to enable the character of the shock absorber to be changed by arranging that the valve for the by-pass takes the form of a sleeve slidable upon the exterior of the metering rod into and out of masking position with respect to the mouth of a lateral conduit in the metering rod which reaches from the by-pass to the exterior of the rod. Thus it will be seen that by sliding the sleeve into or out of masking position the character of the shock absorber can be changed.

It is another object of the invention to arrange that in a double-acting shock absorber the two directions of movement of the piston shall have different shock-absorbing values. Conveniently, therefore, the aforesaid sleeve valve is spring-urged in the direction to cause one end to abut closely against a shoulder carried on the metering rod and close the conduit mouth, and the bore of the sleeve valve is enlarged from the said end to a position such that the enlarged bore overlies the conduit mouth when the latter is closed by the sleeve valve to provide a face in the sleeve valve against which fluid under pressure from the by-pass can operate to move the sleeve valve against the spring pressure and open the conduit mouth. This arrangement ensures that the by-pass shall be operative only for one direction of flow of the damping fluid so that in a double-acting shock absorber, for instance, the shock-absorbing value for movement of the piston in one direction will be different from the value for the opposite direction of movement.

The enlargement of the bore of the sleeve valve may in some circumstances take the form of a straight or rounded chamfer of the inner edge of the rim of the bore in such manner that the chamfer overlies the conduit mouth when the latter is closed by the sleeve valve. It will be appreciated that this construction will also provide a face in the sleeve valve against which fluid under pressure from the by-pass can operate to open the sleeve valve.

It is another object of the invention to assist the aforesaid spring to keep the sleeve valve closed. Therefore, where the exterior of the sleeve valve is exposed to the fluid pressure in the piston cylinder, it is sometimes advantageous so to form the exterior of the sleeve valve and of the shoulder against which it abuts to close the conduit mouth, that in its said closing position the sleeve valve offers to the said cylinder pressure a face so disposed that cylinder pressure against it assists to maintain the sleeve valve in closing position, but that the sleeve valve does not offer to the cylinder pressure a face so disposed that cylinder pressure against it tends to move the sleeve valve from closed into open position.

It is a further object of the invention to place the aforesaid sleeve valve under the control of an operator. Thus, if desired there may be combined with the sleeve valve, regulating means situated at the exterior of the shock absorber and coupled to a movable element inside the shock absorber, which movable element co-operates with the sleeve valve and can be moved into and out of a position in which it renders the latter inoperative. Thus the automatic opening and closing of the sleeve valve-controlled lateral conduit may be precluded at the will of the operator. There may be a masking device for the said lateral conduit, which masking device is movable by the said regulating means into and out of a position in which it masks the said conduit itself and renders the sleeve valve inoperative. The said movable element may take the form of a second sleeve on the exterior of the metering rod and this second sleeve may be utilised to provide the shoulder towards which the sleeve valve is spring-urged.

It is another object of the invention to improve the sensitiveness of the shock absorber by applying control to the fluid inside the metering rod. With this in view, instead of the bore of the metering rod offering an unobstructed passage for the transit of the fluid, a pin may be provided which reaches longitudinally into the interior of the metering rod to co-operate with the sleeve valve in the control of the by-pass. This longitudinal pin may be used for metering the flow through the bore of the metering rod and may be movable and reach to the exterior of the shock absorber for connection to the aforesaid regulating means. If such a movable longitudinal pin is employed, it may be connected to the aforesaid second sleeve on the metering rod by a cross pin reaching through the said lateral conduit which is shaped to limit the endwise movement of the longitudinal pin in such manner that in one setting the second sleeve masks the lateral conduit and in another setting the second sleeve is so placed as to afford a shoulder against which the sleeve valve bears when in its conduit-closing position.

In an alternative construction the said longitudinal pin is itself movable endwise into and out of masking position with respect to the said lateral conduit.

It is another object of the invention to improve the shock absorber by permitting a constant leak of damping fluid past the sleeve valve. Thus associated with the sleeve valve-controlled lateral conduit, there may be a second lateral conduit between the by-pass and the exterior of the metering rod, which second conduit is always open for the passage of damping fluid. The aforesaid longitudinal pin may be employed to meter the passage of fluid through this second lateral conduit, and it may be so shaped and disposed as not itself substantially to obstruct communication between the by-pass and the sleeve valve-controlled lateral conduit. It may afford a passage through its interior, past its portion which meters the second lateral conduit, for the transit of fluid towards the sleeve valve-controlled lateral conduit.

For a more complete understanding of the invention there will now be described, by way of example only and with reference to the accompanying drawings, certain constructional forms of shock absorber according to the invention. It is to be understood, however, that the invention is not restricted to the precise constructional details set forth.

In these drawings—

Figure 2 is a detail sectional view of a modified construction on a scale larger than that of Figure 1;

Figure 3 is a view somewhat similar to Figure 2 of another modified construction;

Figure 4 is a view similar to Figure 2 of a further modified construction;

Figure 5 is a view corresponding to Figure 2 of another modified construction;

Figure 6 is a section on the line 6—6 of Figure 5;

Figure 7 is a view corresponding to Figure 6 but showing certain of the parts in a different setting;

Figure 8 is a view corresponding to Figure 2 of another modified construction;

Figure 9 is a section on the line 9—9 of Figure 8;

Figure 10 is a view corresponding to Figure 9 but showing certain of the parts in a different setting, and Figure 11 is a section on the line 11—11 of Figure 8.

Like reference numerals indicate like parts throughout the drawings.

Figure 1:
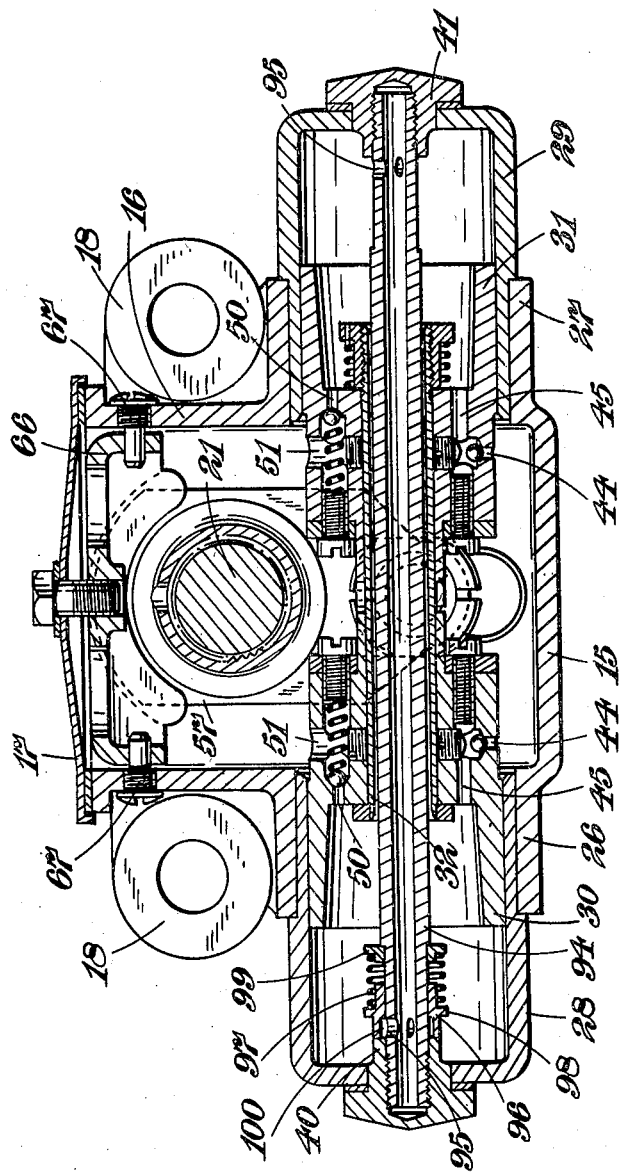
Figure 1 is a sectional elevation corresponding in many respects to Figure 1 of the drawings of United States specification No. 389,249.

Referring firstly to Figure 1, as indicated above, the construction shown therein corresponds in many respects to the constructions shown in Figure 1 of United States specification No. 389,249, Patent No. 2,297,562, September 29, 1942. This being so, it is not necessary to describe herein all of the details of the construction. The main features are as follows: The shock absorber comprises a casing 15 with an upstanding centre barrel 16 having a cover plate 17. At the sides there are lugs 18 whereby the casing is mounted in place and the barrel 16 provides bearings for a rock shaft 21 which is connected to one of the parts to be controlled by the shock absorber. The casing 15 has bosses 26 and 27 which receive the fluid container cylinders 28 and 29 in which are pistons 30 and 31 which are received on a sleeve 32 and a seal is made between each piston and the appropriate end of the sleeve. The outer ends of the cylinders 28 and 29 have end caps 40 and 41 into both of which a metering rod 94 is screwed. The metering rod 94 reaches right through the interior of the sleeve 32 and the restricted passage through which the damping fluid passes between the cylinders 28 and 29 lies between the opposed surfaces of the sleeve 32 and the metering rod 94. The barrel 16 constitutes a recuperator chamber from which there is made up any loss of damping fluid from the two cylinders through ducts 44 and 45. 50 and 51 are relief ducts. Inside the casing 15 there is attached to the rock shaft 21 a rock arm whereof one of the plates is shown at 57. A saddle piece 66, secured to the barrel 16 by pins 67, anchors the cover 17 and takes up endwise thrust on the rock shaft 21.

In use it will be appreciated that the fluid will be forced from the cylinder 28 to the cylinder 29 and vice versa along the restricted passage between the sleeve 32 and the metering rod 94 as the rock shaft oscillates. If the rod 94 were of constant diameter and solid, as is the rod 42 in Figure 1 of United States Patent No. 2,297,562, the construction would be double acting and the damping effort would be applied equally during turning of the rock arm in both directions. The metering rod can be readily detached without dismantling the whole of the parts of the shock absorber, if, for instance, it is desired to fit a different metering rod in order to change the value of the shock absorber. Thus the rod 94 could be substituted for the aforesaid solid rod 42.

The rod 94 which is employed in carrying out the present invention is hollow and near each end has lateral conduits 95 establishing communication between its interior and exterior. The conduits 95 towards the left in Figure 1 can be masked by a slidable sleeve valve 96 mounted upon the rod 94 and urged into contact with the inner end of the cap 40 by a spring 97 which bears at one end against an enlargement 98 on the sleeve valve 96 and at the other end against an abutment 99 carried on the rod 94. At its end which masks the conduits 95, the sleeve valve 96 has its bore enlarged at 100. This enlarged bore overlies the mouths of the conduits 95 and extends to the left-hand end of the sleeve valve 96. The base of the enlarged bore provides a surface whereby fluid under pressure in the interior of the rod 94 can force the sleeve valve 96 towards the right, thereby uncovering the conduits 95. It will be appreciated that the bore of the rod 94 provides a by-pass with respect to the restricted passage which lies between the exterior of the rod 94 and the interior of the sleeve 32. This by-pass is only operative in one direction however, namely, when the pistons are moving towards the right, as seen in Figure 1. In this direction of movement, fluid expelled from the cylinder 29 can not only pass along the usual restricted passage, but can also pass through the interior of the rod 94 towards and into the cylinder 28. For this direction of movement of the pistons therefore the damping effort will be less than when the pistons are moving towards the left, as seen in Figure 1, because for this latter direction of movement, the fluid can only be expelled from the cylinder 28 through the restricted passage between the rod 94 and the sleeve 32 because the sleeve valve 96 will be maintained by the spring 97 in the position in which it masks the conduits 95. By choosing a suitable strength for the spring 97, any desired difference in the value of the shock absorber for the two directions of movement of its pistons can be selected.

Referring now to Figure 2, it will be seen that the sleeve valve 96 therein, instead of being formed with an enlarged cylindrical bore 100 as in Figure 1, has the inner rim of its end which abuts against the cap 40 formed with a straight chamfer 101 which overlies the mouths of the conduits 95 when the latter are closed by the sleeve valve 96. This will allow the fluid from the interior of the rod 94 to push the sleeve valve 96 back against the pressure of the spring 97 and open the by-pass to the interior of the cylinder 28. In the construction shown in Figure 3 the sleeve valve 96 has a rounded chamfer 102 for the same purpose.

In the construction shown in Figure 4 the end of the sleeve valve 96 which abuts against the cap 40 is formed with an annular groove 103 surrounding the bore of the sleeve valve. This reduces the contact area between the sleeve valve and the cap 40, facilitates a close fit being obtained and reduces leakage. In this construction it will also be seen that the enlargement 98 is continued to the left-hand end of the sleeve valve 96 which abuts against the cap 40, thus offering to the cylinder pressure a face (namely, the stepped right-hand end of the valve 96, 98) so disposed that cylinder pressure against it assists the spring 97 to maintain the sleeve valve 96 in closing position. In this construction the sleeve valve 96 does not offer to the said cylinder pressure a face so disposed (namely, directed towards the left) that cylinder pressure against it tends to move the sleeve valve from closed position (namely, abutting the cap 40) into open position.

In the construction shown in Figures 5 to 7 the arrangement of the sleeve valve 96 is reversed as compared with that shown in Figures 1 to 4. The spring 97 bears at one end against the end cap 40 and urges the sleeve valve towards the right. The lateral conduits 95 in this construction are elongated and are not situated so close to the end of the rod 94 as in the constructions shown in Figures 1 to 4. The shoulder against which the sleeve valve 96 abuts to close the conduits 95 is provided by a second sleeve 104 which is slidable endwise on the rod 94. A cross pin 105 reaches from the second sleeve 104 through the elongated conduits 95 to allow the sleeve 104 to be moved between two settings which are determined by the ends of the elongated conduits 95. The two settings are shown in Figures 6 and 7. In the setting shown in Figure 7 the sleeve 104 masks the conduits 95 and thus renders the sleeve valve 96 inoperative. In the setting shown in Figure 6 the sleeve 104 affords an abutment against which the sleeve valve 96 is pressed in its closing position. The cross pin 105 is coupled to the end of a pin 106 which reaches from the exterior of the shock absorber endwise into the bore of the rod 94. The portion of the pin 106 which lies opposite to the conduits 95 is of such shape and proportion as not substantially to obstruct communication between the bore of the rod 94 and the conduits 95. The pin 106 is connected by a Bowden wire or other connection 107 to a regulating device (not shown) operable, say, by the driver of a car on which the shock absorber is mounted. Thus the driver will be able to set the sleeve 104 in such a position that the conduits 95 are either operative or inoperative. When they are inoperative the shock absorber will be fully double acting.

In the construction shown in Figures 5 to 7 there are also shown additional lateral conduits 108 extending between the interior and the exterior of the rod 94. These conduits 108 are always open and thus a continuous by-pass in both directions is provided for the restricted passage between the sleeve 32 and the rod 94. The pin 106, however, reaches past the conduits 108 and can be employed to meter the passage of fluid therethrough since the portion of the pin 106 opposite to the conduits 108 can be made to any desired dimensions or formation to achieve the desired metering effect.

In the construction shown in Figures 8 to 11 the sleeve valve 96 is arranged in a manner corresponding to that adopted in the construction shown in Figures 1 to 4 and the lateral conduits 95 which it controls are situated close to the cap 40, the other lateral conduits 108, which are always open, being situated further from the end of the rod 94. Inside the bore of the rod 94 there is received a longitudinal pin 109 which is connected to a regulating device by means 107 similar to those described above in connection with Figures 5 to 7. The pin 109 is endwise slidable in the bore of the rod 94 into and out of such a position that it masks the conduits 95. In Figure 10 it is shown in masking position and in Figure 9 it is shown withdrawn from masking position. Adjacent to its portion of full diameter the pin 109 is flatted or waisted at 110, this reduced portion lying opposite to the conduits 95 in the setting shown in Figure 9. The pin 109 is bored at 111 from its other end to communicate with the exterior of the reduced portion 110 to enable fluid from the interior of the rod 94 to pass through the pin 109 to get to the conduits 95. At its portion which lies opposite to the lateral conduits 108 the pin 109 can be made of such a size as to apply a metering effect to the fluid passing through those conduits. By a suitable change in the setting of the pin 109 the shock absorber can be converted from double acting to single acting and vice versa as desired without interfering with the metering of the constantly maintained by-pass through the conduits 108.

It is to be understood that the invention is not restricted to the precise constructional details set forth.

I claim:

1. In a shock absorber in which fluid friction is employed for damping, the combination of two fluid containers, a piston reciprocable in said containers and having a perforation extending through it from end to end, a hollow metering rod which reaches into the perforation in such manner that the piston reciprocates along the metering rod, the opposed surfaces of which perforation and metering rod provide between them a restricted passage connecting the said fluid containers, through which passage the fluid is forced by the said piston, and the interior of which metering rod constitutes a by-pass for the said restricted passage, which hollow metering rod is formed with a lateral conduit extending through its wall from the interior to the exterior of the rod, and a valve in the form of a sleeve slidable upon the exterior of the metering rod into and out of masking position with respect to the mouth of the said lateral conduit.

2. In a shock absorber in which fluid friction is employed for damping, the combination of two fluid containers, a piston reciprocable in said containers and having a perforation extending through it from end to end, a hollow metering rod which reaches into the perforation in such manner that the piston reciprocates along the metering rod, the opposed surfaces of which perforation and metering rod provide between them a restricted passage connecting the said fluid containers, through which passage the fluid is forced by the said piston, and the interior of which metering rod constitutes a by-pass for the said restricted passage, which hollow metering rod is formed with a lateral conduit extending through its wall from the interior to the exterior of the rod, an abutment providing an external shoulder on said rod, a valve in the form of a sleeve slidable upon the exterior of the metering rod into and out of a position in which one end makes close contact with said shoulder which is so situated that when the sleeve valve is in contact with it the sleeve valve closes the mouth of the said lateral conduit, and a spring urging the sleeve valve in the direction towards the said shoulder, the bore of which sleeve valve is enlarged from the said end to a position such that the enlarged bore overlies the conduit mouth when the latter is closed by the sleeve valve to provide a face in the sleeve valve against which fluid under pressure from the by-pass can operate to move the sleeve valve against the spring pressure and open the conduit mouth.

3. In a shock absorber in which fluid friction is employed for damping, the combination of two fluid containers, a piston reciprocable in said containers and having a perforation extending through it from end to end, a hollow metering rod which reaches into the perforation in such manner that the piston reciprocates along the metering rod, the opposed surfaces of which perforation and metering rod provide between them a restricted passage connecting the said fluid containers, through which passage the fluid is forced by the said piston, and the interior of which metering rod constitutes a by-pass for the said restricted passage, which hollow metering rod is formed with a lateral conduit extending through its wall from the interior to the exterior of the rod, an abutment providing an external shoulder on said rod, a valve in the form of a sleeve slidable upon the exterior of the metering rod into and out of a position in which one end makes close contact with said shoulder which is so situated that when the sleeve valve is in contact with it the sleeve valve closes the mouth of the said lateral conduit, and a spring urging the sleeve valve in the direction towards the said shoulder, the bore of which sleeve valve is enlarged from the said end to a position such that the enlarged bore overlies the conduit mouth when the latter is closed by the sleeve valve to provide a face in the sleeve valve against which fluid under pressure from the by-pass can operate to move the sleeve valve against the spring pressure and open the conduit mouth, and the end of the sleeve valve which abuts against the said shoulder is annularly grooved about the bore of the sleeve valve, for the purpose specified.

4. In a shock absorber in which fluid friction is employed for damping, the combination of two fluid containers, a piston reciprocable in said containers and having a perforation extending through it from end to end, a hollow metering rod which reaches into the perforation in such manner that the piston reciprocates along the metering rod, the opposed surfaces of which perforation and metering rod provide between them a restricted passage connecting the said fluid containers, through which passage the fluid is forced by the said piston, and the interior of which metering rod constitutes a by-pass for the said restricted passage, which hollow metering rod is formed with a lateral conduit extending through its wall from the interior to the exterior of the rod, an abutment providing an external shoulder on said rod, a valve in the form of a sleeve slidable upon the exterior of the metering rod into and out of a position in which one end makes close contact with said shoulder which is so situated that when the sleeve valve is in contact with it the sleeve valve closes the mouth of the said lateral conduit, and a spring urging the sleeve valve in the direction towards the said shoulder, the exterior of which sleeve valve is exposed to the fluid pressure in the piston container, and the formation of the exterior of which sleeve valve and of the shoulder against which it abuts to close the conduit mouth is such that in its said closing position the sleeve valve offers to the fluid pressure in the piston container a face so disposed that the said fluid pressure against it assists the spring to maintain the sleeve valve in closing position, but that the sleeve valve does not offer to the said fluid pressure a face so disposed that the said fluid pressure against it tends to move the sleeve valve from closed to open position.

5. In a shock absorber in which fluid friction is employed for damping, the combination of two fluid containers, a piston reciprocable in said containers and having a perforation extending through it from end to end, a hollow metering rod which reaches into the perforation in such manner that the piston reciprocates along the metering rod, the opposed surfaces of which perforation and metering rod provide between them a restricted passage connecting the said fluid containers, through which passage the fluid is forced by the said piston, and the interior of which metering rod constitutes a by-pass for the said restricted passage, which hollow metering rod is formed with a lateral conduit extending through its wall from the interior to the exterior of the rod, a valve in the form of a sleeve slidable upon the exterior of the metering rod into and out of masking position with respect to the mouth of the said lateral conduit, regulating means situated at the exterior of the shock absorber, a movable element inside the shock absorber, and means for coupling the regulating means to the said movable element, which latter co-operates with the sleeve valve and can be moved into and out of a position in which it renders the latter inoperative.

6. In a shock absorber in which fluid friction is employed for damping, the combination of two fluid containers, a piston reciprocable in said containers, and having a perforation extending through it from end to end, a hollow metering rod which reaches into the perforation in such manner that the piston reciprocates along the metering rod, the opposed surfaces of which perforation and metering rod provide between them a restricted passage connecting the said fluid containers, through which passage the fluid is forced by the said piston, and the interior of which metering rod constitutes a by-pass for the said restricted passage, which hollow metering rod is formed with a lateral conduit extending through its wall from the interior to the exterior of the rod, a valve in the form of a sleeve slidable upon the exterior of the metering rod into and out of masking position with respect to the mouth of the said lateral conduit, regulating means situated at the exterior of the shock absorber, a movable masking device for the said lateral conduit, and means for coupling the regulating means to the said movable masking device, which latter is movable by the regulating means into and out of a position in which it masks the said conduit itself and renders the sleeve valve inoperative.

7. In a shock absorber in which fluid friction is employed for damping, the combination of two fluid containers, a piston reciprocable in said containers and having a perforation extending through it from end to end, a hollow metering rod which reaches into the perforation in such manner that the piston reciprocates along the metering rod, the opposed surfaces of which perforation and metering rod provide between them a restricted passage connecting the said fluid containers, through which passage the fluid is forced by the said piston, and the interior of which metering rod constitutes a by-pass for the said restricted passage, which hollow metering rod is formed with a lateral conduit extending through its wall from the interior to the exterior of the rod, a valve in the form of a sleeve slidable upon the exterior of the metering rod into and out of masking position with respect to the mouth of the said lateral conduit, regulating means situated at the exterior of the shock absorber, a movable masking sleeve on the exterior of the metering rod, and means for coupling the regulating means to the said masking sleeve, which latter is movable by the regulating means into and out of a position in which it masks the said conduit itself and renders the sleeve valve inoperative.

8. In a shock absorber in which fluid friction is employed for damping, the combination of two fluid containers, a piston reciprocable in said containers and having a perforation extending through it from end to end, a hollow metering rod which reaches into the perforation in such manner that the piston reciprocates along the metering rod, the opposed surfaces of which perforation and metering rod provide between them a restricted passage connecting the said fluid containers, through which passage the fluid is forced by the said piston, and the interior of which metering rod constitutes a by-pass for the said restricted passage, which hollow metering rod is formed with a lateral conduit extending through its wall from the interior to the exterior of the rod, and which metering rod has an external shoulder, a valve in the form of a sleeve slidable upon the exterior of the metering rod into and out of a position in which one end makes close contact with said shoulder which is so situated that when the sleeve valve is in contact with it the sleeve valve closes the mouth of the said lateral conduit, a spring urging the sleeve valve in the direction towards the said shoulder, regulating means situated at the exterior of the shock absorber, a movable masking device for the said lateral conduit, which masking device provides the said shoulder towards which the sleeve valve is spring-urged, and means for coupling the regulating means to the said movable masking device, which latter is movable by the regulating means into and out of a position in which it masks the said conduit itself and renders the sleeve valve inoperative.

9. In a shock absorber in which fluid friction is employed for damping, the combination of two fluid containers, a piston reciprocable in said containers and having a perforation extending through it from end to end, a hollow metering rod which reaches into the perforation in such manner that the piston reciprocates along the metering rod, the opposed surfaces of which perforation and metering rod provide between them a restricted passage connecting the said fluid containers, through which passage the fluid is forced by the said piston, and the interior of which metering rod constitutes a by-pass for the said restricted passage, which hollow metering rod is formed with a lateral conduit extending through its wall from the interior to the exterior of the rod, a valve in the form of a sleeve slidable upon the exterior of the metering rod into and out of masking position with respect to the mouth of the said lateral conduit, and a pin which reaches longitudinally into the interior of the metering rod to co-operate with the sleeve valve in the control of the by-pass.

10. In a shock absorber in which fluid friction is employed for damping, the combination of two fluid containers, a piston reciprocable in said containers and having a perforation extending through it from end to end, a hollow metering rod which reaches into the perforation in such manner that the piston reciprocates along the metering rod, the opposed surfaces of which perforation and metering rod provide between them a restricted passage connecting the said fluid containers, through which passage the fluid is forced by the said piston, and the interior of which metering rod constitutes a by-pass for the said restricted passage, which hollow metering rod is formed with a lateral conduit extending through its wall from the interior to the exterior of the rod, a valve in the form of a sleeve slidable upon the exterior of the metering rod into and out of masking position with respect to the mouth of the said lateral conduit, regulating means situated at the exterior of the shock absorber, a pin which reaches to the exterior of the shock absorber and is movable endwise in the interior of the metering rod to co-operate with the sleeve valve in the control of the by-pass, and means for coupling the regulating means to the said movable pin.

11. In a shock absorber in which fluid friction is employed for damping, the combination of two fluid containers, a piston reciprocable in said containers and having a perforation extending through it from end to end, a hollow metering rod which reaches into the perforation in such manner that the piston reciprocates along the metering rod, the opposed surfaces of which perforation and metering rod provide between them a restricted passage connecting the said fluid containers, through which passage the fluid is forced by the said piston, and the interior of which metering rod constitutes a by-pass for the said restricted passage, which hollow metering rod is formed with a lateral conduit extending through its wall from the interior to the exterior of the rod, a valve in the form of a sleeve slidable upon the exterior of the metering rod into and out of masking position with respect to the mouth of the said lateral conduit, regulating means situated at the exterior of the shock absorber, a pin which reaches to the exterior of the shock absorber and is movable endwise in the interior of the metering rod to co-operate with the sleeve valve in the control of the by-pass, a movable masking sleeve on the exterior of the metering rod, a cross pin reaching through the said lateral conduit for coupling said longitudinal pin to the masking sleeve, and means for coupling the regulating means to the longitudinal pin, which lateral conduit is shaped to limit the endwise movement of the longitudinal and cross pins in such manner that in one setting the masking sleeve masks the lateral conduit and in another setting the masking sleeve is so placed as to afford a shoulder against which the sleeve valve bears when in its conduit-closing position.

12. In a shock absorber in which fluid friction is employed for damping, the combination of two fluid containers, a piston reciprocable in said containers and having a perforation extending through it from end to end, a hollow metering rod which reaches into the perforation in such manner that the piston reciprocates along the metering rod, the opposed surfaces of which perforation and metering rod provide between them a restricted passage connecting the said fluid containers, through which passage the fluid is forced by the said piston, and the interior of which metering rod constitutes a by-pass for the said restricted passage, which hollow metering rod is formed with a lateral conduit extending through its wall from the interior to the exterior of the rod, a valve in the form of a sleeve slidable upon the exterior of the metering rod into and out of masking position with respect to the mouth of the said lateral conduit, regulating means situated at the exterior of the shock absorber, a pin which reaches to the exterior of the shock absorber and is movable endwise in the interior of the metering rod into and out of a position in which it masks the said lateral conduit, and means for coupling the regulating means to the said movable pin.

13. In a shock absorber in which fluid friction is employed for damping, the combination of two fluid containers, a piston reciprocable in said containers and having a perforation extending through it from end to end, a hollow metering rod which reaches into the perforation in such manner that the piston reciprocates along the metering rod, the opposed surfaces of which perforation and metering rod provide between them a restricted passage connecting the said fluid containers, through which passage the fluid is forced by the said piston, and the interior of which metering rod constitutes a by-pass for the said restricted passage, which hollow metering rod is formed with two associated lateral conduits extending through its wall from the interior to the exterior of the rod, one of which conduits is constantly open for the passage of damping fluid, and a valve in the form of a sleeve slidable upon the exterior of the metering rod into and out of masking position with respect to the mouth of the other lateral conduit.

14. In a shock absorber in which fluid friction is employed for damping, the combination of two fluid containers, a piston reciprocable in said containers and having a perforation extending through it from end to end, a hollow metering rod which reaches into the perforation in such manner that the piston reciprocates along the metering rod, the opposed surfaces of which perforation and metering rod provide between them a restricted passage connecting the said fluid containers, through which passage the fluid is forced by the said piston, and the interior of which metering rod constitutes a by-pass for the said restricted passage, which hollow metering rod is formed with two associated lateral conduits extending through its wall from the interior to the exterior of the rod, one of which conduits is constantly open for the passage of damping fluid, a pin which reaches longitudinally into the interior of the metering rod to meter the passage of fluid through the said constantly open lateral conduit, and a valve in the form of a sleeve slidable upon the exterior of the metering rod into and out of masking position with respect to the mouth of the other lateral conduit.

15. In a shock absorber in which fluid friction is employed for damping, the combination of two fluid containers, a piston reciprocable in said containers and having a perforation extending through it from end to end, a hollow metering rod which reaches into the perforation in such manner that the piston reciprocates along the metering rod, the opposed surfaces of which perforation and metering rod provide between them a restricted passage connecting the said fluid containers, through which passage the fluid is forced by the said piston, and the interior of which metering rod constitutes a by-pass for the said restricted passage, which hollow metering rod is formed with two associated lateral conduits extending through its wall from the interior to the exterior of the rod, one of which conduits is constantly open for the passage of damping fluid, a pin which reaches longitudinally into the interior of the metering rod to meter the passage of fluid through the said constantly open lateral conduit, which pin is so shaped and disposed as not itself substantially to obstruct communication between the by-pass and the other lateral conduit, and a valve in the form of a sleeve slidable upon the exterior of the metering rod into and out of masking position with respect to the mouth of the said other lateral conduit.

16. In a shock absorber in which fluid friction is employed for damping, the combination of two fluid containers, a piston reciprocable in said containers and having a perforation extending through it from end to end, a hollow metering rod which reaches into the perforation in such manner that the piston reciprocates along the metering rod, the opposed surfaces of which perforation and metering rod provide between them a restricted passage connecting the said fluid containers, through which passage the fluid is forced by the said piston, and the interior of which metering rod constitutes a by-pass for the said restricted passage, which hollow metering rod is formed with two associated lateral conduits extending through its wall from the interior to the exterior of the rod, one of which conduits is constantly open for the passage of damping fluid, a pin which reaches longitudinally into the interior of the metering rod to meter the passage of fluid through the said constantly open lateral conduit, which pin affords a passage through its interior, past its portion which meters the said lateral conduit, for the transit of fluid towards the other lateral conduit, and a valve in the form of a sleeve slidable upon the exterior of the metering rod into and out of masking position with respect to the mouth of the said other lateral conduit.

ERNEST WILLIAM JOHNSON.